July 3, 1956     J. J. LAREW ET AL     2,753,505
SERVOMECHANISM
Filed Nov. 30, 1953
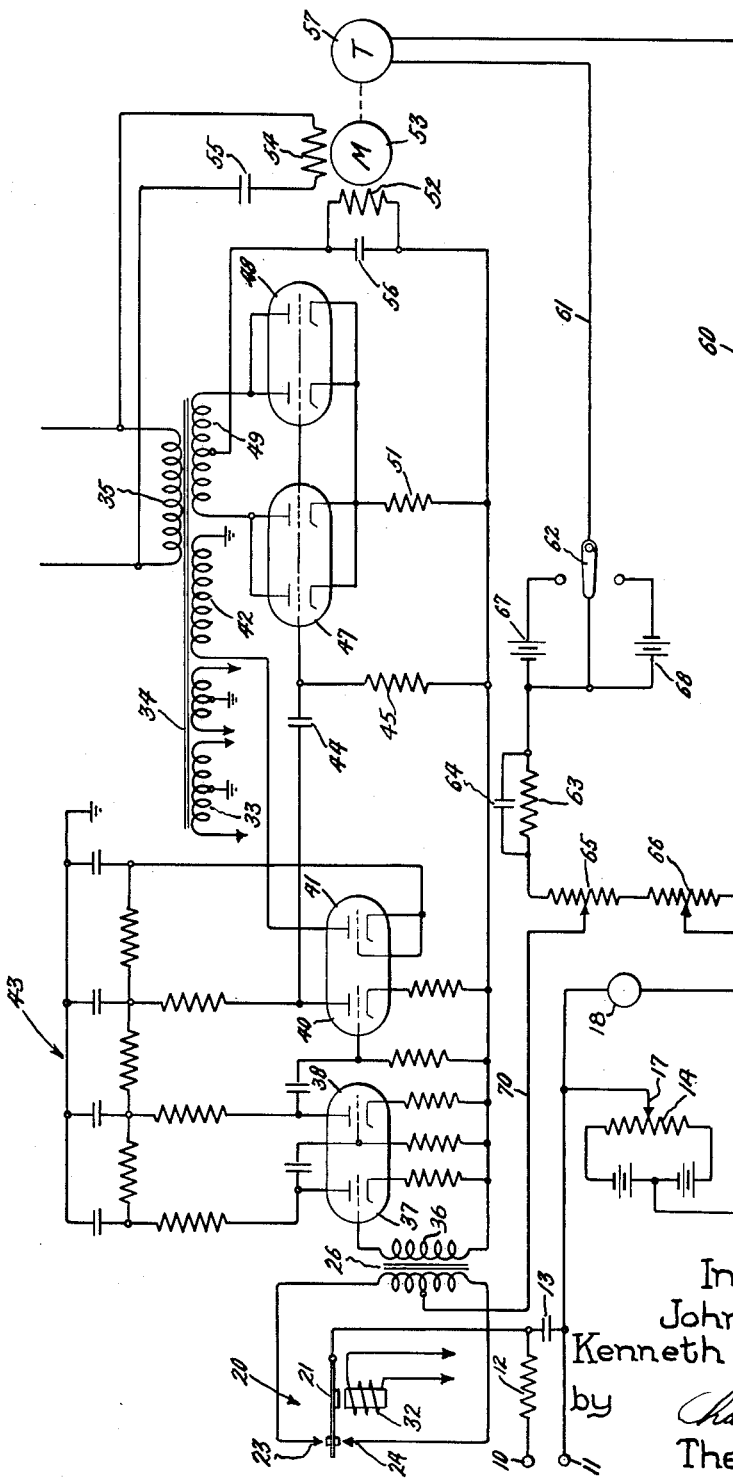
Inventors:
John J. Larew:
Kenneth N. Burnett,
by
Charles W. Helzer
Their Attorney.

United States Patent Office 2,753,505
Patented July 3, 1956

2,753,505

SERVOMECHANISM

John J. Larew, Scotia, and Kenneth N. Burnett, Schenectady, N. Y., assignors to General Electric Company, a corporation of New York Application November 30, 1953, Serial No. 395,117

3 Claims. (Cl. 318—327)

This invention pertains to servo mechanisms.

More particularly, the invention relates to a novel servo mechanism which serves to compare the amplitude of a direct current input signal with the amplitude of a reference direct current signal, and to cause a motor comprising a part thereof to rotate at a speed which is proportional to the difference in amplitude between the signals. The motor rotates in one direction when the input signal is larger than the reference signal, and in the other direction when the input signal is smaller than the reference signal.

A primary object of the invention is to provide a servo mechanism of the type described, in which the plot of the speed of rotation of the motor output shaft versus the deviation of the input signal from the reference signal passes through the intersection of the coordinate axes. The plot is substantially a straight line when the signal deviation lies between preselected positive and negative values, and the slope thereof is adjustable.

Another object is to provide such a mechanism which includes a motor wherein, when the input signal deviation from the reference signal exceeds predetermined positive or negative values, the output shaft of the motor rotates at a constant speed.

A further object is to provide a servo mechanism having the above set forth characteristics wherein a constant signal bias may be added to or subtracted from the input signal to cause the output shaft of the motor to rotate at a speed which is greater or lesser by a fixed amount than that indicated by the input signal deviation.

Apparatus constructed in accordance with the invention may comprise means for comparing a direct current input signal with an adjustable reference signal to produce a difference or error voltage. The error signal is then converted into an alternating current signal, in a manner such that the phase of the converted error signal either agrees with or is 180° out of phase with a 60-cycle line voltage which energizes the system, depending on whether the direct current error signal is positive or negative. The alternating current error signal is amplified and supplied to a phase comparator that comprises a pair of triode electron discharge devices having a common cathode connection. The anodes of the two triode discharge devices are energized from opposite ends of a secondary winding of a transformer, whose primary is energized by the 60-cycle line voltage, and the center tap of the secondary winding is connected through one phase of a two-phase motor to the common cathodes of the tubes. The other winding of the two-phase motor is connected through a capacitor to the primary winding of the transformer. Thus, it is seen that if there is a direct current error signal, one or the other of the triodes will conduct during a portion of each alternating current cycle, and the phase of the motor which is connected in the anode circuit of the tubes will be energized by a direct current pulse during one or the other halves of each cycle. It is also apparent that the half of the cycle during which the direct current pulse energizes the motor winding is determined by the phase of the alternating current error signal with respect to the 60-cycle line voltage and the voltage which appears on the anodes of the triodes, and the phase of the alternating current error signal in this respect is controlled by the polarity of the direct current error signal. Thus, the two-phase motor will be caused to rotate in one direction if the direct current error signal is positive, and in the opposite direction if the error signal is negative.

Feedback signal generating means comprising a tachometer is caused to rotate by the two-phase motor, and the output of the tachometer is fed back to the input circuit where the amplitude of the direct current input signal is compared with that of the reference signal. This negative feedback from the tachometer causes the speed of rotation of the two-phase motor to be proportional to the direct current error signal, and means are provided to adjust the amount of feedback. In addition, means are provided for inserting a predetermined positive or negative voltage in series with the direct current feedback, thereby causing the two-phase motor to turn faster or slower than indicated by the direct current error signal by a fixed amount. In addition, the maximum speed at which the two-phase motor will turn is limited by the characteristics of the two phase motor.

For a better understanding of the invention, reference is made to the following description, taken in conjunction with the accompanying drawing, whose single figure is a diagrammatic circuit diagram of one form of the invention.

Referring to the drawing, the direct current input signal whose value it is desired to compare with a reference signal, may be connected between a pair of input terminals 10 and 11. The input signal is coupled through a smoothing filter network comprising a resistor 12 and a capacitor 13 which is connected between input terminals 10 and 11 and which serves to shunt any alternating current ripple voltage that might be superimposed on the direct current signal. A reference direct current electric signal is derived from a potentiometer 14 connected in series circuit relationship with the capacitor 13, and having a voltmeter 18 connected in parallel therewith. The series circuit formed by capacitor 13 and potentiometer 14 is coupled to a means for converting direct current to alternating current electric energy. This means comprises a solenoid operated chopping device 20 having a movable armature 21 and a pair of fixed contacts 23 and 24 connected to opposite ends of the primary winding of a transformer 26. The operation of the chopper 22 is well-known in the art, and will not be described in detail. Briefly, however, the chopper is actuated by an operating winding 32 that is supplied from a low voltage secondary winding 33 of a main power transformer 34, whose primary winding 35 may be connected to a standard 60-cycle alternating current power line. As the operating winding 32 is energized by the 60-cycle alternating current flowing therethrough, the armature 21 is caused to vibrate between contacts 23 and 24 at the same frequency as the current through operating winding 32. Thus, during one-half of each cycle of the alternating current supplied to operating winding 32, current flows through one-half of the primary winding of transformer 26, and during the other half cycle of the alternating supply current flows through the other half of the primary winding. The direction of this current flow depends on whether the direct current signal supplied by the series circuit comprised by capacitor 13 and potentiometer 14 is positive or negative; that is, the current flow through the primary winding of transformer 26 may be from the ends of the winding to the center tap if the error signal is of one polarity, and from the center tap to the ends of the winding if the error signal is of the other polarity.

Thus, an alternating current signal will be induced in the secondary winding of transformer 26 which is in phase with the voltage appearing across operating winding 32 if the direct current signal supplied to armature 21 is of one polarity, and which is 180° out of phase with the voltage across operating winding 32 if the direct current signal is of the opposite polarity. Because the phase of the voltage across operating winding 32 (which is derived from secondary winding 33 of transformer 34) is taken to be in phase with the 60-cycle line voltage, the 60-cycle line voltage which energizes primary winding 35 of transformer 34 may be used as an alternating current reference voltage. Hence, by comparing the phase of the alternating current signal induced across secondary winding of transformer 26 to the phase of the 60-cycle line voltage supplied through primary winding 35 of transformer 34, an indication may be obtained of the polarity of the direct current signal supplied capacitor 13 and potentiometer 14.

The alternating current error signal induced in the secondary winding of transformer 26 is coupled to the control grid of the first stage of a conventional three-stage resistance-capacitance coupled amplifier, comprised of triode electron discharge devices 37, 38 and 40, along with the necessary anode and cathode load resistors and the interstage resistor-capacitor coupling circuits. Anode voltage is supplied to the anodes of the discharge devices 37, 38 and 40 by a half-wave rectifier formed by a triode electron discharge device 41 having the control grid and cathode thereof interconnected. Rectifier 41 is energized from a secondary winding 42 on main power transformer 34, and the direct current output thereof is supplied through a conventional resistance-capacitance filter network 43 to the respective anode electrodes of electron discharge devices 37, 38 and 40.

The amplified alternating current error signal appearing on the anode of triode electron discharge device 40, which is of opposite phase from that appearing across the secondary winding of transformer 26, is coupled through a coupling capacitor 44 and a grid biasing resistor 45 to the control grids of a pair of duo-triode electron discharge devices 47 and 48. The anodes of duo-triode 47 are connected together to one terminal of a secondary winding 49 of power supply transformer 34, and the anodes of duo-triode 48 are connected together to the remaining terminal of secondary winding 49. The four cathode electrodes of the duo-triode tubes 47 and 48 are interconnected through a common cathode load resistor 51. From the foregoing description, it is believed apparent that the anodes of duo-triode 47 will be energized by a potential that is 180° out of phase with the potential that energizes the anodes of duo-triode 48. A center tap on secondary winding 49 of transformer 34 is connected to one field winding 52 of a two-phase motor 53, whose other winding 54 is connected through a capacitor 55 to the 60-cycle line voltage input, which was previously mentioned as being the phase reference alternating current voltage for the amplifier. The capacitor 55 in series with winding 54 serves to insure that the current through winding 54 is 90° out of phase with the current through winding 52 for reasons which will be pointed out later in detail. A capacitor 56 is connected across winding 52 which serves to filter and tune the output circuit of the final stage.

As was previously mentioned, an alternating current error signal is placed on the input of the three-stage amplifier which will be in phase, or 180° out of phase, with the 60-cycle line voltage input. Therefore, the alternating error signal placed on control grids of duo-triodes 47 and 48 will also be in phase, or 180° out of phase, with the 60-cycle line voltage which energizes primary winding 35 of transformer 34. Hence, the alternating error signal will be either in phase with the anode voltage of duo-triode 47 and 180° out of phase with the anode voltage of duo-triode 48, or vice versa. If there is an alternating current error signal on the grids of the duo-triodes 47 and 48, one of the duo-triodes will conduct more heavily than the other and there will be more current through motor winding 52 during one half-cycle than during the other half-cycle to cause the motor 53 to rotate in one direction or the other. Of course, the direction in which the motor turns is determined by the polarity of the direct current error signal, and its speed of rotation is related to the amplitude of the direct current error signal. It is pointed out that at balance, when there is no error signal, equal currents flow through motor winding 52 during both halves of each cycle, and the motor 53 does not rotated.

The motor 53 is connected to a feedback signal developing means comprising a direct current tachometer 57 which, when rotated in one direction, produces a direct current feedback voltage of a certain polarity, and, when rotated in the opposite direction, produces a direct current feedback voltage of the opposite polarity. The direct current feedback voltage produced by tachometer 57 as motor 53 rotates, is fed back to the error signal circuit, previously described, to linearize the plot of the output speed of motor 53 versus direct current error signal input. One side of the tachometer 57 output is connected through a conductor 60 to potentiometer 14, and the other side is connected through a second conductor 61 to the movable contact of a three position selector switch 62. One of the fixed contacts of the three position selector switch is connected directly through smoothing network formed by a resistor 63 and a capacitor 64 to one end of a voltage divider network comprised of a pair of variable resistors 65 and 66 connected in series circuit relationship. The remaining fixed contacts of selector switch 74 are likewise connected through a pair of batteries 67 and 68 respectively, and through smoothing filter 63 and 64 (which acts as an anti-hunt network) to the voltage divider 65 and 66. By proper selection of the fixed contacts of switch 62 a positive or negative voltage may be added in series with the direct current feedback voltage developed by tachometer 57. Because the movable contact of resistor 65 is connected through a conductor 70 to the midtap point of the primary winding of transformer 26, this modified feedback signal is added to or subtracted from the direct current error signal developed by capacitor 13 and potentiometer 14 to thereby cause motor 57 to move faster or slower than that speed indicated by the direct current error voltage by a fixed amount. It is apparent that as various amounts of the direct current feedback signal of tachometer 57 are fed back to the error signal developing input circuit comprising by potentiometer 14 and capacitor 13, the slope of the curve of the output motor speed versus input volts will be varied, and will be stabilized thereby. It is also apparent that if the direct current feedback voltage is too small, this output curve will cease to be linear. It is the function of voltage divider 65, 66 to set the amount of direct current feedback voltage available. Thus, the setting of the movable contact of resistor 66 is determined by the amount of D. C. feedback voltage required to linearize the output curve of motor speed versus error voltage, and is influenced by the slope desired for this curve. This control might be labeled slope adjustment or feedback adjustment. The desired slope for the curve of output speed versus input error signal is determined by the specific application in which the servo mechanism is used, and is controlled by the setting of movable contact pickoff arm of resistor 65.

For purposes of explanation and description, let it be assumed that during hte first half of each cycle of the 60-cycle reference voltage, current flows through the upper half (as seen in the drawing) of the primary winding of transformer 26, and during the second half of each cycle, current flows through the lower half of the winding. Let it also be assumed that the direct current input signal connected between input terminals 10 and 11 is more positive than the reference signal taken from potentiometer 14, and, therefore, that current will flow downwardly through the upper half of the primary winding of transformer 26 during the first half of each cycle, and upwardly through the lower half of the winding during the second half of each cycle. Thus, it is assumed that the alternating current error signal appearing across the secondary winding of transformer 26 is in phase with the 60-cycle voltage supplied across the primary winding 35 of main power transformer 34. Therefore, because the amplifier comprising discharge devices 37, 38 and 40 has an odd number of stages, the signal appearing on the anode of discharge device 40 will be 180° out of phase with the reference 60-cycle supply voltage. Now, let it also be assumed that the anode voltage on the anodes of duo-triode 47 is in phase with the 60-cycle power line reference voltage, and thus anode voltage on the anodes of duo-triode 48 is 180° out of phase with this reference voltage. Therefore, during the first half of each cycle the alternating current error signal appearing on the control grids of the duo-triodes will be negative, while the voltage appearing on anodes of tube 47 will be positive, and the voltage on anodes of tube 48 will be negative. Therefore, during this first half cycle, the control grids of tube 47 are negative with respect to the anodes thereof, and the control grids of tube 48 are negative with respect to the anodes thereof, and if the alternating current error signal is great enough no current will flow through the duo-triodes. However, during the second half of each cycle the alternating current error signal placed on the control grids will be positive, the anodes of tube 47 will be negative, but anodes of tube 48 will be positive. Therefore, current will flow through duo-triode 48 during the second half of each cycle. Thus, depending on the connections, the current flowing through motor winding 52 will be either 90° ahead or 90° behind that current flowing through motor winding 54. Motor 53 will thus turn in a cerain direction. As the motor 53 turns, tachometer 57 generates a direct current feedback voltage which is fed back, and appears across resistors 63, 65 and 66. This feedback voltage is of proper polarity to act as a negative feedback, in the manner well-known in electronic circuitry. Thus, the direct current error signal tends to be reduced as the motor speed is increased and the net effect is to cause the speed of motor 53 to stabilize at a speed which is proportional to the direct current error input signal.

Conversely, if the direct current input signal connected across terminals 10 and 11 is negative with respect to the reference voltage set on potentiometer 14, during the first half of each cycle current will flow upwardly through the upper half of the primary winding of transformer 26, and will flow downwardly during the lower half of the winding during the second half of each cycle. Thus, the signal appearing across the secondary winding of the transformer will be 180° out of phase with the 60-cycle line voltage which energizes primary winding 35 of the main power supply transformer 34. Again, the alternating current signal appearing on the anode of discharge device 40 will be 180° out of phase with the input, and thus will be in phase with the 60-cycle reference voltage. During the first half of each cycle, as was previously pointed out, anodes of tube 47 are positive, and anodes of tube 48 are negative. Thus, during the first half of each cycle, in the present illustration where the direct current error voltage is negative rather than positive, the control grids of discharge devices 47 will be positive at the same time that the anodes thereof are positive. Therefore, current will flow through discharge device 47 during the first half of each cycle. During the second half of each cycle, the signal appearing on control grids is negative, and, therefore, if the signal is of sufficient magnitude neither of the duo-triode discharge devices in the final stage will conduct. Thus, it is seen from the two examples just described, that when the direct current error signal is positive, current flows through motor winding 52 during the second half of each cycle, and when the direct current error signal is negative current flows through motor winding 52 during the first half of each cycle. Because of capacitor 55 in series with motor winding 54, the current flowing through motor winding 52 will be either displaced in phase 90° ahead or 90° lagging the current through winding 54, and motor 53 will turn in opposite directions when the direct current error signal input is positive or negative. A suitable direct current feedback signal will then be developed and fed back to the input of the mechanism in the manner described above.

When the servo amplifier of the invention is incorporated into a system, a conventional selsyn or synchro may be connected to the motor 53 through gears or other means, and be so connected as to operate to cause the direct current input signal between terminals 10 and 11 to be varied as the motor and the synchro rotate in such direction as to approach the direct current reference signal set on potentiometer 14.

The particular embodiment of the invention described and shown herein is adapted to operate with a direct current input signal of the order of not more than several hundred millivolts. Therefore, the various circuit constants, such as the size of potentiometer 14 and resistors 65 and 66 are of the particular size to permit such operation. For example, only a very small amount of the direct current voltage generated by tachometer 57 need be fed back to the input error signal generating circuit. Therefore, resistor 63 is of the order of several hundred times the size of resistor 66, and resistor 63 is of the order of one hundred ohms. Similarly, batteries used in the mechanism are of very low voltage. The following schedule of values of the parameters of the circuit is cited as exemplary only, and the invention should not be construed as being limited to these values only. It is to be understood, however, that certain changes may be made in the circuit to adapt it to operate with an input of any desired magnitude.

| | |
|---|---|
| Resistor 12 | .47 meg. |
| Capacitor 13 | 4 UF. |
| Cathode load resistor, tube 37 | 2.2 K. |
| Cathode load resistor, tube 38 | 1.8 K. |
| Cathode load resistor, tube 40 | 1.8 K. |
| Plate load resistor, tubes 37, 38, 40 | 1 meg. |
| Grid resistor, tube 38 | 1 meg. |
| Grid resistor, tube 40 | 1 meg. |
| Coupling capacitors, tubes 37, 38, 40 | .05 UF. |
| Grid resistors, tubes 47 and 48 | 150 K. |
| Cathode resistor, tubes 47 and 48 | 150 ohms. |
| Resistor 63 | 500 K. |
| Resistor 65 | 1 K. |
| Resistor 66 | 100 Ω |

It is apparent that various changes may be made in the circuit, as using various conventional methods of converting the direct current error signal into an alternating current error signal, and, of course, various types of alternating current amplifiers may be substituted for the amplifiers comprising triodes 37, 38 and 40. Various other changes and modifications may be made in the circuit by one skilled in the art without departing from the spirit of the invention, and it is intended to be limited only by the scope of the appended claims.

What we claim as new and desire to secure by Letters Patent of the United States is:

1. A servomechanism including in combination electric signal input means, electric reference signaling developing means connected with said signal input means, phase comparator means operatively coupled to said signal input and reference signal developing means for deriving an electric difference control signal, an electric motor having the field winding thereof operatively coupled to the output of said comparator for controlling the speed of said motor means in accordance with said difference control signal, feedback signal generating means operatively coupled to said motor for generating an electric feedback signal proportional to the speed of said motor, connector means interconnecting said feedback signal generating means with said signal input and said reference signal developing means, feedback signal modifying means connected in said feedback connector means for adding a predetermined constant signal to the feedback signal, and adjusting means connected in said feedback connector means for adjusting the amount of said feedback signal supplied to said signal input and reference signal developing means.

2. A servomechanism including in combination electric electric signal input means, direct current electric reference signal developing means connected in circuit relationship with said signal input means, electric signal converting means coupled to said signal input and said reference signal developing means for converting the direct current error signal thereof into an alternating current error signal, phase comparator means having the inputs thereof operatively coupled to the output of said converting means and to a reference source of alternating electric energy for deriving an electric difference control signal representative of the phase and amplitude difference between said alternating error signal and the alternating reference signal, an electric motor having a field of winding thereof operatively coupled to the output of said phase comparator means for controlling the speed of said motor in accordance with said difference control signal, feedback signal generating means operatively coupled to said motor for generating a direct current feedback signal proportional to the speed of the motor, connector means interconnecting the output of said generator means with said signal input and said direct current electric reference signal developing means, feedback signal modifying means connected in said feedback connector means for adding a predetermined direct voltage to the feedback signal, and adjusting means connected in said feedback connector means for adjusting the amount of said feedback signal supplied to said signal input and reference signal developing means.

3. A servomechanism including in combination a pair of signal input terminals, a direct current electric reference signal developing potentiometer connected in circuit relationship with said signal input means, direct electric signal converting means comprising a signal chopping device connected in series electrical circuit relationship with said signal input terminals, and said reference signal developing potentiometer for converting the direct current error signal developed therebetween into an alternating current error signal, phase comparator means having the inputs thereof operatively coupled to the output of said signal chopping device and to a reference source of alternating electric energy for deriving an electric difference control electric representative of the phase and amplitude difference between said alternating error signal and the alternating reference signal, an electric motor having a field winding thereof operatively coupled to the output of said phase comparator means for controlling the speed of said motor in accordance with said difference control signal, feedback signal generating means operatively coupled to said motor for generating a feedback signal proportional to the speed of the motor, connector means interconnecting the output of said generator means with said signal input and said direct current electric reference signal developing means, said connector means including a selector switch connected in circuit relationship to one side of said feedback signal generating means and having a plurality of fixed contacts, a voltage divider comprising a plurality of series connected resistors, a plurality of conductive paths equal in number to the number of fixed contacts connected in parallel circuit relationship to one end of said voltage divider, certain ones of said conductive paths including a source of direct current voltage for modifying said feedback signal in a predetermined manner, conductor means connecting the remaining end of said voltage divider to the remaining side of said feedback signal generating means, and means interconnecting said voltage divider in series circuit relationship with said signal input terminals and said potentiometer.

References Cited in the file of this patent
UNITED STATES PATENTS

| | | |
|---|---|---|
| 2,105,598 | Hubbard | Jan. 18, 1938 |
| 2,113,164 | Williams | Apr. 5, 1938 |
| 2,113,436 | Williams | Apr. 5, 1938 |
| 2,367,746 | Williams | Jan. 23, 1945 |
| 2,431,257 | Kellog | Nov. 18, 1947 |
| 2,503,085 | Williams | Apr. 4, 1950 |
| 2,550,030 | Wild | Apr. 24, 1951 |
| 2,595,034 | Wild | Apr. 29, 1952 |